United States Patent
Kim et al.

(10) Patent No.: US 8,782,453 B2
(45) Date of Patent: Jul. 15, 2014

(54) NETWORK POWER MANAGEMENT APPARATUS AND METHOD

(75) Inventors: Ki-Won Kim, Daejeon-si (KR); Ho-Young Song, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 280 days.

(21) Appl. No.: 13/327,615

(22) Filed: Dec. 15, 2011

(65) Prior Publication Data

US 2012/0159215 A1   Jun. 21, 2012

(30) Foreign Application Priority Data

Dec. 17, 2010 (KR) .................. 10-2010-0130276

(51) Int. Cl.
*G06F 11/30* (2006.01)
*G06F 1/32* (2006.01)

(52) U.S. Cl.
USPC ........... 713/321; 713/300; 713/310; 713/320; 713/322; 713/323; 713/324; 713/330; 713/340

(58) Field of Classification Search
USPC .................. 713/300, 310, 320–324, 330, 340
See application file for complete search history.

(56) References Cited

U.S. PATENT DOCUMENTS 6,963,747 B1 *  11/2005  Elliott ........................... 455/450
7,944,899 B2 *   5/2011  Nordmark et al. ............ 370/338
2011/0028175 A1 *  2/2011  Chang et al. .................. 455/509
2011/0054709 A1 *  3/2011  Son ............................... 700/286
2011/0255514 A1 * 10/2011  Olofsson et al. .............. 370/331
2012/0100884 A1 *  4/2012  Radulescu et al. ............ 455/524
2012/0106370 A1 *  5/2012  Radulescu et al. ............ 370/252

FOREIGN PATENT DOCUMENTS

KR   1020040079774    9/2004
KR   1020060028199    3/2006
KR   1020090029998    3/2009

* cited by examiner

*Primary Examiner* — M Elamin
(74) *Attorney, Agent, or Firm* — Nelson Mullins Riley & Scarborough LLP; Anthony A. Laurentano, Esq.; Dipti Rammarain, Esq.

(57) ABSTRACT

A network power management apparatus and method. The network power management apparatus includes a protocol management unit configured to be connected to a local communication apparatus and establish and manage a path between the local communication apparatus and neighboring communication apparatuses in the same network. The protocol management unit includes a delivery unit to deliver link information and power information of the local communication apparatus to the neighboring communication apparatuses, a first database to store the link information and the power information of the local communication apparatus and link information and power information of each of the neighboring communication apparatuses, a path management unit to calculate and establish a path using the information stored in the first database, and a packet generating unit to generate a power message using the power information of the local communication apparatus and deliver the generated power message to the neighboring communication apparatuses.

15 Claims, 4 Drawing Sheets

NETWORK POWER MANAGEMENT APPARATUS AND METHOD

CROSS-REFERENCE TO RELATED APPLICATION(S)

This application claims the benefit under 35 U.S.C. §119 (a) of Korean Patent Application No. 10-2010-0130276, filed on Dec. 17, 2010, in the Korean Intellectual Property Office, the entire disclosure of which is incorporated herein by reference for all purposes.

BACKGROUND

1. Field

The following description relates to a network power management apparatus and a power management method using the network power management apparatus, and more particularly, to a network power management apparatus that obtains information about power consumed by a communication apparatus in a network, and a power management method using the network is power management apparatus.

2. Description of the Related Art

In an effort to reduce power consumption in communication apparatuses, researches on, for example, routing exchange methods, power efficient communication elements, power effective forwarding devices, power down and protection for overload prevention, and low-power switch and switching methods have been actively carried out in various fields in terms of a communication network node. In addition, researches on methods to build a low-power network capable of providing communication services in the same way as a configuration and management method for Internet protocol (IP) router devices, switches, and various communication devices in an optical layer and Ethernet layer have been actively conducted.

For application or use of the above power-save/low power of the communication network, primarily power consumption condition should be managed. Furthermore, for effective management of overall power consumption in a communication network, an apparatus for collecting and managing power use information is required.

However, a system for managing power consumption/usage and power saving is much desired in a conventional communication network such as an IP public network, and there is no standardized interface between devices or for a communication network. Furthermore, an additional power consumption measurement apparatus and an additional power management network or system for collecting and managing measurement information are separately operated, resulting in a substantial amount of manufacturing and maintenance cost and an increase in power consumption by the additional apparatuses.

As IP standard protocol, IGP protocol (IS-IS, OSPF) is a link state information and routing information exchange protocol. A network structure topology (logic network) of the is overall communication network is formed using the IGP protocol. According to the standard document IETF RFC 5305, 5307, 5329, traffic engineering is provided by extending a message using information such as a maximum link bandwidth, a maximum reserved link bandwidth, a non-reserved bandwidth, traffic engineering metric information and the like. However, extended power related information and messages of a communication apparatus are not used yet.

Hence, a communication apparatus and a communication network are in need of a standardized interface for collecting and maintaining power-related information used for power saving and low power.

SUMMARY

The following description relates to a network power management apparatus that manages power consumption based on power consumed by a node in a network, and a power management method using the network power management apparatus.

In one general aspect, there is provided a network power management apparatus including: a protocol management unit configured to be connected to a local communication apparatus, and establish and manage a path between the local communication apparatus and neighboring communication apparatuses in the same network as the local communication apparatus by communicating with the neighboring communication apparatuses, wherein the protocol management unit is further configured to comprise a delivery unit configured to deliver link information and power information of the local communication apparatus to the neighboring communication apparatuses, a first database configured to store the link information and the power information of the local communication apparatus and link information and power information of each of the neighboring communication apparatuses, a path management unit configured to calculate and establish a path using the information stored in the first database, and is a packet generating unit configured to generate a power message using the power information of the local communication apparatus and deliver the generated power message to the neighboring communication apparatuses.

The network power management apparatus may further include an apparatus management unit configured to be connected to the protocol management unit, collect the power information of each of the neighboring communication apparatuses, and deliver the collected power information to the protocol management unit.

The apparatus management unit may be further configured to include an information collecting unit configured to collect power information about an amount of power consumed by the local communication apparatus and an information transforming unit configured to transform the collected information in accordance with a predefined standard and deliver the transformed information to the protocol management unit.

The packet generating unit may be further configured to maintain a communication between the local communication apparatus and the neighboring communication apparatuses by delivering a Hello packet to the neighboring communication apparatuses.

The packet generating unit may be further configured to count the number of the Hello packets and periodically deliver the link information and the power information of the neighboring communication apparatus.

The power information may include at least one of a voltage, a current, a power, an unbalanced voltage, an amount of reactive power, an amount of active power, harmonic wave, voltage sag, a momentary power failure, a voltage swell, and a power factor.

The protocol management unit may be further configured to be connected to a power monitoring apparatus to monitor power information of the communication apparatuses in the same network.

The protocol management unit may be further configured to, when link information of the local communication apparatus has been changed, deliver the changed link information and the power information to the neighboring communication apparatuses.

The power monitoring apparatus may be configured to include a packet processing unit configured to receive the link information and the power information from each of the local communication apparatus and the neighboring communication apparatuses, a packet analysis unit configured to receive the link information and the power information from each of the local communication apparatus and the neighboring communication apparatuses and analyze the received power information, a power information management unit configured to manage the power information analyzed by the packet analysis unit, a power topology management unit configured to receive the power information from the power information management unit and manage a network topology using the received power information, and a second database configured to receive the information stored in the first database from the packet processing unit and store the received information.

The power monitoring apparatus may be further configured to further include a peer maintaining unit configured to inform that the power monitoring apparatus is being connected to the protocol management unit via the packet processing unit.

The path management unit may be further configured to calculate and establish a path using the link information and the power information.

In another general aspect, there is provided a network power management method of a local communication apparatus and neighboring communication apparatuses connected to the local communication apparatus in the same network to manage power consumption and a path between the local communication and the neighboring communication apparatuses, the network power management method including: collecting power information of each of the local is communication apparatus and the neighboring apparatuses; sharing the power information between the local communication apparatus and the neighboring communication apparatuses by issuing a message between the local and neighboring communication apparatuses wherein the message contains the power information and is divided into a standard region and an extended region, and recording the link information of each of the local and neighboring communication apparatuses in the standard region and recording the power information of each of the local and neighboring communication apparatuses in the extended region; and calculating and establishing a path between the local communication apparatus and the neighboring communication apparatuses using the link information and the power information.

The network power management method may further include receiving and displaying the power information.

The message containing the power information may be periodically issued.

When the link information of the local communication apparatus has been changed, the link information and the power information may be delivered to the neighboring communication apparatuses.

Other features and aspects may be apparent from the following detailed description, the drawings, and the claims.

Figure 1:
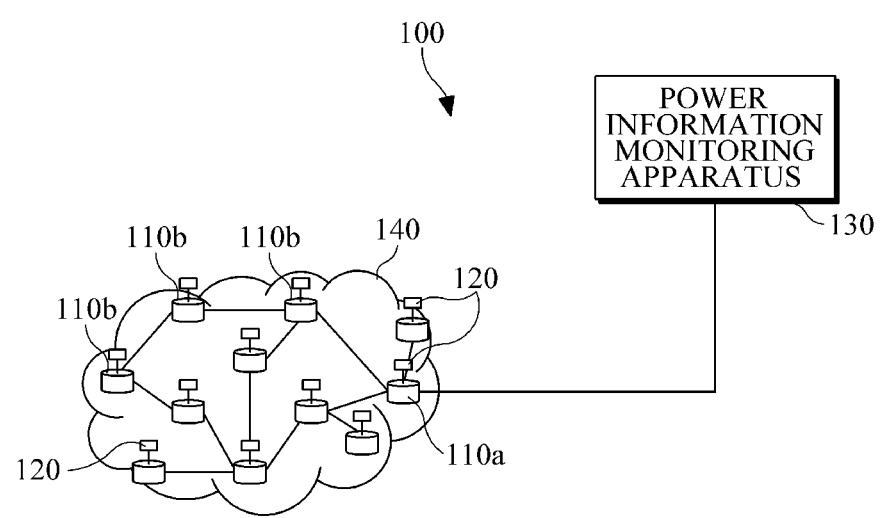
FIG. 1 is a diagram illustrating an example of a communication system using a network power management apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates a diagram of an example of a communication system using a network power management apparatus.

Referring to FIG. 1, the communication system may include a local communication apparatus 110a, neighboring communication apparatuses 110b, and a power information monitoring apparatus 130. Each of the communication apparatuses 110a and 110b may include the network power management apparatus 120. The network power management apparatus 120 connects the corresponding communication apparatus 110a or 110b to the power information monitoring apparatus 130, thereby allowing the power information monitoring apparatus 130 to is monitor power information of each communication apparatus 110a and 110b. In the example, for convenience of explanation, only one communication apparatus is connected to the power information monitoring apparatus 130. In addition, the communication apparatus connected to the power information monitoring apparatus 130 is referred to as a local communication apparatus 110a, and the remaining communication apparatuses are referred to as neighboring apparatuses 110b.

Each of the local communication apparatus 110a and the neighboring communication apparatuses 110b may include a router, and the local communication apparatuses 110a and 110b are connected to each other by a predefined topology. The local communication apparatus 110a and the neighboring communication apparatuses 110b may exchange link state information and routing information with one another according to interior gateway protocol (IGP), intermediate system-to-system (IS-IS) or the like, which is Internet protocol (IP) standard protocol. Additionally, each of the local communication apparatus 110a and the neighboring communication apparatuses 110b may include the network power management apparatus 120 which collects information related to power consumed by each of the local communication apparatus 110a and the neighboring communication apparatuses 110b. The network power management apparatus 120 may store information exchanged between the local communication apparatus 110a and the neighboring communication apparatuses 110b in a database (not illustrated). The database may store information including link state information, maximum link bandwidth, maximum reserved link bandwidth, non-reserved bandwidth, traffic engineering metric information, information about power consumed by each of the local communication apparatus 110a and the neighboring communication apparatuses 110b. The network power management apparatus 120 may establish a routing table using a path algorithm based on the database. In this case, the network power management apparatus 120 may use information is stored in the database to form the network topology using the information stored in the database.

The power information monitoring apparatus 130 may be connected to any of the local communication apparatus 110a and the neighboring communication apparatuses 110b and may monitor information collected by the network power management apparatus 120 to manage the power of the connected communication apparatus.

Figure 2:
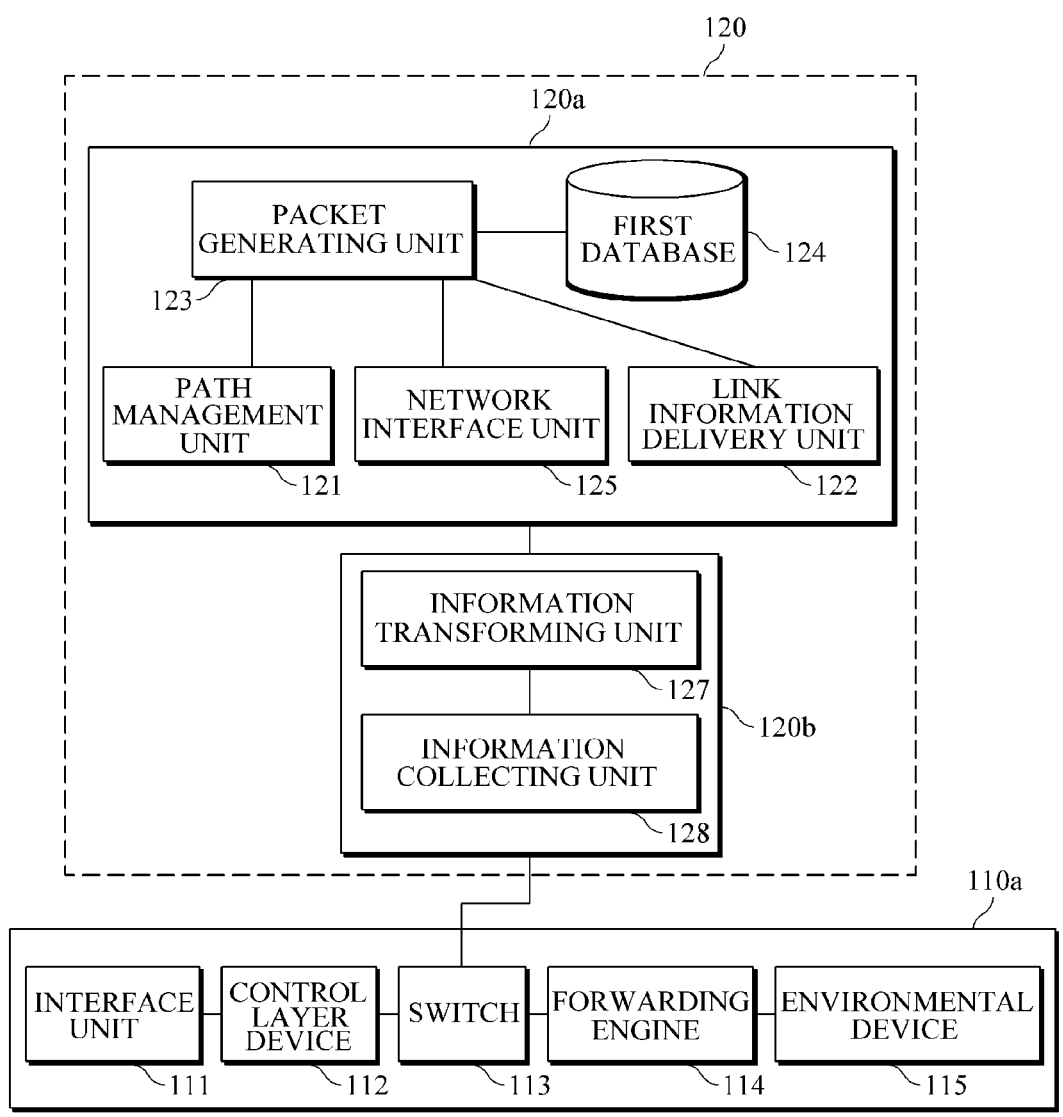
FIG. 2 is a diagram illustrating an example of a network power management apparatus shown in the example illustrated in FIG. 1.

FIG. 2 illustrates a diagram of an example of a network power management apparatus shown in the example illustrated in FIG. 1.

Referring to FIG. 2, the network power management apparatus 120 may include a protocol management unit 120a and an apparatus management unit 120b.

The protocol management unit 120a may include a path management unit 121, a link information delivery unit 122, a packet generating unit 123, a first database 124, and a network interface unit 125. The path management unit 121 may recognize a path between the connected communication apparatuses 110a and 110b in a predefined topology to find the shortest route. In this case, the path management unit 121 may calculate a route using information of each of the local communication apparatus 110a and the neighboring communication apparatuses 110b which is stored in the first database 124. The link information delivery unit 122 may deliver the information of the local communication apparatus 110a to the neighboring communication apparatuses 110b. Thus, all communication apparatuses 110a and 110b belonging to the same network are allowed to share their information. The packet generating unit 123 may generate an IGP message containing power information, input received information in the first database 124, and control the link information delivery unit 122 to deliver the link information to the neighboring communication apparatus 110b in the network 140. In addition, the packet generating unit 123 may provide power information and link information to the path is management unit 121, allowing the path management unit 121 to calculate and establish a path. Moreover, the packet generating unit 123 may transmit and/or receive information to and from the neighboring communication apparatus 110b through the network interface 125. In this case, an extended IGP message may be divided into a standard region and an extended region. The standard region is the same as a general IGP message, and the extended region may be shown as Table 1 below.

TABLE 1

| Sub-type | Length | Value |
|---|---|---|
| N + 1 | Variable | Total Amount of Power Used |
| N + 2 | Variable | Maximum Peak Power Consumption |
| N + 3 | Variable | Minimum Peak Power Consumption |
| N + 4 | Variable | Overload Power Threshold |
| N + 5 | Variable | Power in Use by Adjacent Link |
| N + 6 | Variable | Maximum Peak Power Consumption by Adjacent Link |
| N + 7 | Variable | Minimum Peak Power Consumption by Adjacent Link |
| N + n | Variable | — |

In table 1, 'Sub-type' represents an extended region of an IGP message, and because the extended region is different from a typical IGP message, 'N' is set to an arbitrary value. In addition, the length may be variable. 'Total Amount of Power Used' indicates a total amount of power used per unit time by the local communication apparatus 110a that delivers the information to the neighboring communication apparatus 110b, 'Maximum Peak Power Consumption' indicates a maximum amount of power used per unit time, and 'Minimum Peak Power Consumption' indicates a minimum amount of power used per unit time. In addition, 'Overload Power Threshold' indicates the maximum peak power value at the moment of determining an overload in the local communication apparatus 110a, 'Power in Use by Adjacent Link' indicates a total amount of power used per unit time by the interface unit 111 of the local communication apparatus 110a that delivers the information to one neighboring communication apparatus 110b among a plurality of neighboring communication apparatuses, 'Minimum Peak Power Consumption by Adjacent Link' indicates a minimum amount of power used per unit time by the interface unit 111 of the local communication apparatus 110a that delivers the information is to the neighboring communication apparatus 110b. Furthermore, a variety of information may be generated using the power information collected by the apparatus management unit 120b.

The first database 124 may calculate a path using the information of the local communication apparatus 110a and the information of the neighboring communication apparatus 110b. In particular, the power information is established in the first database 124. The power information may include information that is measured by the local communication apparatus 110a and the neighboring communication apparatus 110b, such as a voltage, a current, a power, an unbalanced voltage, an amount of reactive power, an amount of active power, harmonic wave, voltage sag, a momentary power failure, a voltage swell, and a power factor. The network interface unit 125 may allow the protocol management unit 120a and the apparatus management unit 120b to be connected to each other and transmit and receive packets therebetween.

The apparatus management unit 120b may include an information collecting unit 128 and an information transforming unit 127. The information collecting unit 128 may receive power information about power of the neighboring communication apparatuses 110a from the local communication apparatus 110a, and the information transforming unit 127 may transform the power information into a format that can be recognized and used by the protocol management is unit 120a and transmit the transformed information to the protocol management unit 120a.

The local communication apparatus 110a may include an interface unit 125, a control layer device 112, a switch 113, a forwarding engine 114, and an environmental device 115. The interface unit 111 may correspond to a port through which the local communication apparatus 110a transmits data, the control layer device 112 may perform processes per each layer, and the switch 113 may control the connection between the local and neighboring communication apparatuses 110a and 110b in the same network. Additionally, the forwarding engine 114 may process a routing table, and the environmental device 115 may be a cooling fan which manages a temperature of a surrounding environment.

Figure 3:
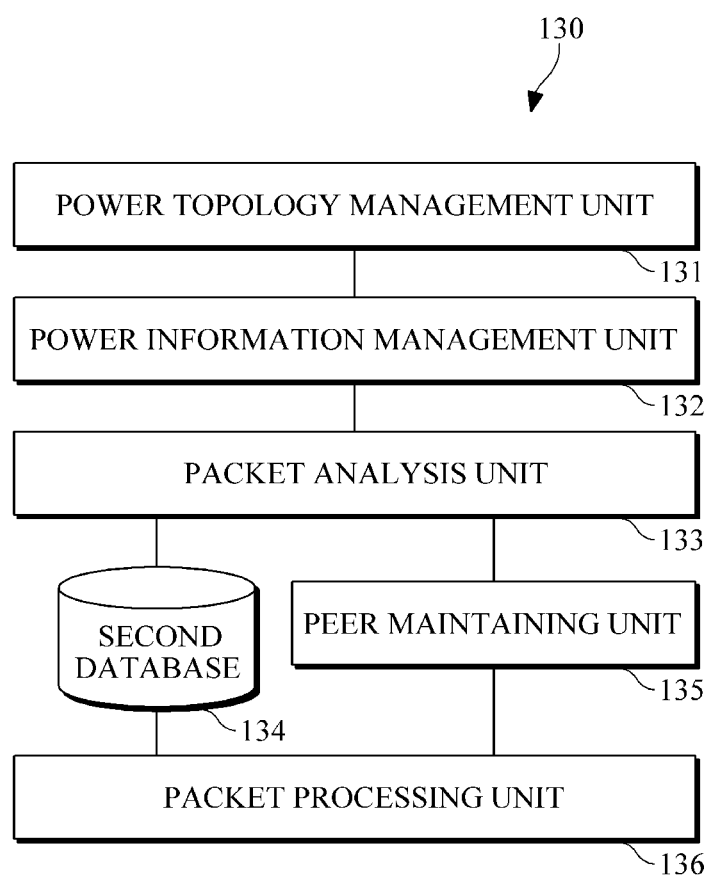
FIG. 3 is a diagram illustrating an example of a power information monitoring apparatus shown in the example illustrated in FIG. 1.

FIG. 3 illustrates a diagram of an example of a power information monitoring apparatus shown in the example illustrated in FIG. 1.

Referring to FIG. 3, the power information monitoring apparatus 130 may include a power topology management unit 131, a power information management unit 132, a packet analysis unit 133, a second database 134, a peer maintaining unit 135, and a packet processing unit 136.

The power topology management unit 131 may provide power information and information about a topology of the communication apparatus. In particular, the power topology management unit 131 may display information about power used by the communication apparatus and information about power used by an input/output interface of the communication apparatus in a network topology, and may generate information about statistics of power usage.

The power information management unit 132 may receive power information analyzed by the packet analysis unit 133 and deliver the received power information to the power topology is management unit 131.

The packet analysis unit 133 may receive power information and link information from the packet processing unit 136 and analyze the received information. In addition, the packet analysis unit 133 may extract power information and transmit the extracted power information to the power information management unit 132. The second database 134 may store the power information and link information.

The second database 134 may receive the power information and the link information from the packet processing unit 136 and store the received information therein. The power information stored in the second database 134 may be power information statistical values such as a total amount of power used for a predefined period of time, an average amount of power used, a maximum amount of power used, and a minimum amount of power used.

The peer maintaining unit 135 may periodically transmit a Hello packet to the network 140 through the packet processing unit 136, and receive a Hello packet from the local communication apparatus 110a periodically in an effort to maintain a session between the power information monitoring apparatus 130 and the local communication apparatus 110a.

The packet processing unit 136 may receive the link information and power information from the neighboring communication apparatuses 110b, deliver the received information to the packet analysis unit 133, and receive the Hello packet from the peer maintaining unit 135 and deliver it to the outside. In addition, the packet processing unit 136 may receive the Hello packet from the outside.

Figure 4:
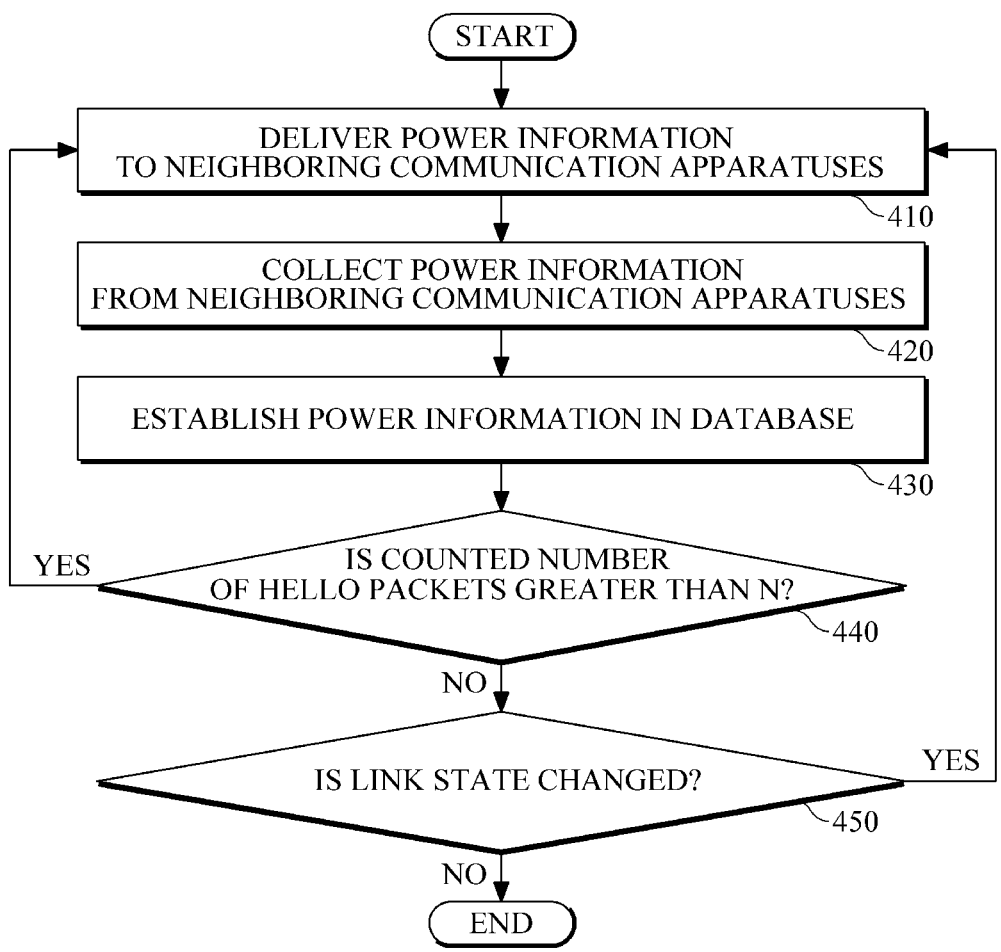
FIG. 4 is a flowchart illustrating an example of a network power management method of the network power management apparatus shown in the example illustrated in FIG. 2 for managing a path and power consumption.

FIG. 4 illustrates a flowchart of an example of a network power management method of the network power management apparatus shown in the example illustrated in FIG. 2 for managing a path and power consumption.

Referring to FIG. 4, the protocol management unit 120a may generate a packet based on received packet information and flood the packet to the neighboring communication apparatus 110b when information in the database 124 or 134 has been changed or link information has been changed due to addition, update, or removal of an interface in the local communication apparatus 110a connected to the protocol management unit 120a. The link information delivery unit 122 may transmit a Hello packet to each of the neighboring communication apparatuses 110b to maintain a session, and deliver link information and power information to the neighboring communication apparatuses 110b in operation 410. In addition, in response to the reception of the link information, the neighboring communication apparatus 110b may transmit a Hello packet to the local communication apparatus 110a to maintain the session, and deliver link information and power information of the own neighboring communication apparatus 110b to the local communication apparatus 110a, and thereby the local communication apparatus 110a and the neighboring communication apparatus 110b share the link information and the power information therebetween. Moreover, the local communication apparatus 110a and the neighboring communication apparatus 110b establish the link information and the power information in each of the databases 124 and 134 in operation 430. The packet generating unit 123 may count the number of Hello packets. If the counted number of Hello packets is greater than n (a natural number greater than 1), the local communication apparatus 110a transmits the link information and the power information to the neighboring communication apparatus 110b. Thus, if the counted number exceeds n, the local communication apparatus 110a starts sharing the link information and the power information again with the neighboring communication apparatus 110b and the local and neighboring communication apparatuses 110a and 110b update periodically the link information and the power information in operation 440. In addition, the packet generating unit 123 may update the link information and the power information of each of is the local communication apparatus 110a and the neighboring communication apparatus 110b when change occurs in the link information and/or the power information of the local and neighboring communication apparatuses 110a and 110b in operation 450.

As described above, according to the network power management apparatus and a power management method using the network power management apparatus, there is no need for an additional power measurement apparatus and a power monitoring apparatus, and thus additional apparatus development and is not required and power consumption is not increased. In addition, information about power used by each of communication apparatuses as nodes of a network and a communication network may be delivered and managed automatically and in real time.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network power management apparatus comprising:
a protocol management unit configured to be connected to a local communication apparatus, and establish and manage a path between the local communication apparatus and neighboring communication apparatuses in the same network as the local communication apparatus by communicating with the neighboring communication apparatuses,
wherein the protocol management unit is further configured to comprise
a delivery unit configured to deliver link information and power information of the local communication apparatus to the neighboring communication apparatuses,
a first database configured to store the link information and the power information of the local communication apparatus and link information and power information of each of the neighboring communication apparatuses,
a path management unit configured to calculate and establish a path using the information stored in the first database, and
a packet generating unit configured to generate a power message using the power information of the local communication apparatus and deliver the generated power message to the neighboring communication apparatuses.

2. The network power management apparatus of claim 1, further comprising:
an apparatus management unit configured to be connected to the protocol management unit, collect the power information of each of the neighboring communication apparatuses, and deliver the collected power information to the protocol management unit.

3. The network power management apparatus of claim 2, wherein the apparatus management unit is further configured to comprise an information collecting unit configured to collect power information about an amount of power consumed by the local communication apparatus and an information transforming unit configured to transform the collected information in accordance with a predefined standard and deliver the transformed information to the protocol management unit.

4. The network power management apparatus of claim 1, wherein the packet generating unit is further configured to maintain a communication between the local communication apparatus and the neighboring communication apparatuses by delivering a Hello packet to the neighboring communication apparatuses.

5. The network power management apparatus of claim 4, wherein the packet generating unit is further configured to count the number of the Hello packets and periodically deliver the link information and the power information of the neighboring communication apparatus.

6. The network power management apparatus of claim 1, wherein the power information includes at least one of a voltage, a current, a power, an unbalanced voltage, an amount of reactive power, an amount of active power, harmonic wave, voltage sag, a momentary power failure, a voltage swell, and a power factor.

7. The network power management apparatus of claim 1, wherein the protocol management unit is further configured to be connected to a power monitoring apparatus to monitor power information of the communication apparatuses in the same network.

8. The network power management apparatus of claim 1, wherein the protocol management unit is further configured to, when link information of the local communication apparatus has been changed, deliver the changed link information and the power information to the neighboring communication apparatuses.

9. The network power management apparatus of claim 8, wherein the power monitoring apparatus is configured to comprise
a packet processing unit configured to receive the link information and the power information from each of the local communication apparatus and the neighboring communication apparatuses,
a packet analysis unit configured to receive the link information and the power information from each of the local communication apparatus and the neighboring communication apparatuses and analyze the received power information,
a power information management unit configured to manage the power information analyzed by the packet analysis unit,
a power topology management unit configured to receive the power information from the power information management unit and manage a network topology using the received power information, and
a second database configured to receive the information stored in the first database from the packet processing unit and store the received information.

10. The network power management apparatus of claim 9, wherein the power monitoring apparatus is further configured to further comprise a peer maintaining unit configured to inform that the power monitoring apparatus is being connected to the protocol management unit via the packet processing unit.

11. The network power management apparatus of claim 1, wherein the path management unit is further configured to calculate and establish a path using the link information and the power information.

12. A network power management method of a local communication apparatus and neighboring communication apparatuses connected to the local communication apparatus in the same network to manage power consumption and a path between the local communication and the neighboring communication apparatuses, the network power management method comprising:
collecting, using the same network, power information of each of the local communication apparatus and the neighboring apparatuses;
sharing, over the network, the power information between the local communication apparatus and the neighboring communication apparatuses by issuing a message between the local and neighboring communication apparatuses wherein the message contains the power information and is divided into a standard region and an extended region, and recording the link information of each of the local and neighboring communication apparatuses in the standard region and recording the power information of each of the local and neighboring communication apparatuses in the extended region; and
calculating and establishing, over the network, a path between the local communication apparatus and the neighboring communication apparatuses using the link information and the power information.

13. The network power management method of claim 12, further comprising:
receiving and displaying the power information.

14. The network power management method of claim 12, wherein the message containing the power information is periodically issued.

15. The network power management method of claim 12, wherein when the link information of the local communication apparatus has been changed, the link information and the power information are delivered to the neighboring communication apparatuses.

* * * * *